3,390,035
METHOD FOR MANUFACTURING TUFTED CARPETS

Seymour Sands, Wilmington, Del., assignor to E. I. du Pont de Nemours and Company, Wilmington, Del., a corporation of Delaware
No Drawing. Continuation-in-part of application Ser. No. 241,548, Dec. 3, 1962. This application May 12, 1966, Ser. No. 549,461
3 Claims. (Cl. 156—72)

ABSTRACT OF THE DISCLOSURE

Tufted carpets are backsized with a non-aqueous, solvent free polymeric material containing a copolymer of ethylene and vinyl acetate by applying the polymeric material to the back side of the carpet as a hot melt.

This application is a continuation-in-part of U.S. application Ser. No. 241,548, filed Dec. 3, 1962 now abandoned.

Background of the invention

In preparing carpets for floor coverings and similar uses it has been the practice to apply adhesives as backsizes in the form of a latex. The wet latex is spread onto the back side of the carpet and is then heated to dry or cure it. Recently, in U.S. Patent 3,142,611, polyethylene, nylon, acetal resins, polyvinyl chloride and polypropylene have been disclosed as suitable thermoplastic backing layers for non-woven pile fabrics. The use of a latex which involves drying or curing is both time consuming and requires careful control in order to prevent damage to the tufted structure. The use of the aforementioned thermoplastic materials also entails problems of control due to their high viscosities at application temperatures.

Description of the invention

It has been found that a tufted carpet having outstanding physical and aesthetic properties is provided by applying to the bottom surface of a tufted structure a layer of molten thermoplastic adhesive material comprised of (1) about 10% to 90% by weight of an ethylene copolymer containing about 60% to 85% by weight of ethylene units and about 40% to 15% by weight of vinyl acetate units, (2) about 90% to 10% by weight of a wax, and (3) optionally, 0 to about 80% of a thermoplastic resin other than the ethylene copolymer, the percentages of the various ingredients being based on the total weight of the composition. As the molten adhesive is distributed uniformly across the back side of the carpet, it penetrates the base of the tufts. The adhesive layer is then cooled, and as it solidifies, the base of each loop or tuft is firmly anchored to the backing material.

The melting point of the adhesive composition should usually be about 160 to 300° F., preferably about 180–220° F.

The tufted carpets of this invention have a coating of polymeric material, generally 10 to 30 ounces per square yard, integrally laminated or adhered to the back side thereof. A wide variety of textile materials may be used in fabricating the carpet. The carpet backing material which is stitched with the pile yarn can be any sheet material adapted for use as the primary backing of a tufted carpet. Useful primary backing materials include woven jute fabric, woven cotton fabric and various known high-strength non-woven fabrics. Jute fabric is commonly used for broadloom carpets and cotton fabric for scatter rugs and bath sets. Jute fabric is ordinarily used in weights of about 9, 10 or 12 ounces per square yard, and cotton fabric in weights of about 3.5 to 10 ounces per square yard.

A useful type of non-woven fabric for the primary backing material is one that contains, as the major fibrous component, continuous synthetic organic filaments having a loopy configuration and separate and random disposition within the fabric, the majority of the loops being disposed substantially in the plane of the fabric, and the filaments being bonded together at spaced points throughout the fabric. By using such a non-woven fabric backing, carpets are obtainable by the present method having improved dimensional stability, resistance to mildew and insects, dyeability, and pile appearance (due to absence of exudation stains). These and other strong non-woven fabrics are available commercially in large quantities and highly uniform qualities.

The essential filaments of the above-mentioned continuous-filament non-woven fabric has a "loopy" configuration; that is, the average length of the individual filaments within any given circle is greater than the diameter of that circle, preferably at least 1.2 times the diameter. The majority of the loops are disposed substantially in the place of the fabric and are to be distinguished from the acute transverse loops which result from needle-punching. Filament loops have either an amplitude of departure from a straight line of at least 0.6 inch associated with a radius of curvature of at least 0.2 inch, or a radius of curvature of over 0.5 inch.

The essential filaments also have a "separate" disposition within the fabric, which means that they are non-aggregated, non-roped, or free of clusters of parallel filaments. In other words, substantially none of the filaments are in juxtaposition with each other over any substantial proportion of their length. They do, of course, often touch at points where they cross.

The fabric filaments can be crimped or noncrimped. Noncrimped filaments are usually preferred for economical reasons. However, a crimped-filament fabric is advantageous when a relatively supple or drapable carpet is desired. In a filament "crimp", the amplitude of the departure from a straight line is less than 3 times the radius of curvature, the latter always being less than 0.5 inch.

Crimp can be imparted to the filaments by known methods, for example, as taught by Hebeler in U.S. Patent 2,604,689, or by Kitson and Reese in Belgian Patent 566,145. The filaments can be crimped either during or after their formation into the fabric.

The major fibrous component of the fabric should be continuous filaments of a fiber-forming synthetic organic polymer. Melt-spinnable polymers are preferred since they can be formed into the required non-woven fabric in a single continuous operation. Particularly preferred are melt-spinnable polymers which form filaments which can be charged by corona discharge or other field charging means, or triboelectrically. Such polymers are exemplified by the following: polyesters, such as poly(ethylene terephthalate) and poly(hexahydro-p-xylylene terephthalate); polyamides, such as poly(hexamethylene adipamide), polycaproamide, and copolymers thereof; polyhydrocarbons, such as polypropylene and polyethylene; polyurethanes; polycarbonates; and polyacetals.

Triboelectrically chargeable filaments become electrostatically charged when they are in intimate rubbing contact with a suitable solid surface, such as a surface comprised of aluminum, brass or chromic oxide.

The nonwoven fabric of the loopy and separate continuous filaments can be made by a process which comprises electrostatically charging a running multifilament yarn, preferably a no-twist yarn, composed of continuous synthetic organic filaments capable of holding an electrostatic charge to a potential sufficient to separate the filaments from one another, followed by collecting the charged and separated filaments on a receiver maintained at a potential differing from that of the filaments. The receiver can be a plate, screen, belt or the like, and is preferably in linear and/or circular motion during filament collection so as to control fabric properties such as shape, uniformity and thickness.

A method which is preferred for its simplicity and efficiency comprises electrically charging freshly meltspun filaments and simultaneously orienting them and urging them towards the receiver by means of an aspirating jet. Enroute to the receiver, the filaments are conveniently triboelectrically charged as they are passed in rubbing contact with guides or the throat of the aspirating jet having a suitable surface for producing the desired charge, such as a surface of aluminum, brass or chromic oxide. The polarity of the induced charge is governed by the relation of composition of the filaments and the surface in rubbing contact therewith as indicated in the triboelectric series of materials—see, for example, V. E. Shashoua in Journal of Polymer Science, 33, p. 65 (1958). Alternatively, the electrical charging can be accomplished at similar locations by means of a field charging device.

Filaments of the non-woven fabric should be bonded together at spaced points (such as cross-over points) throughout the fabric. Such bonding gives the fabric strength and adapts it for carpet-backing utility. Spaced bonding of the filaments in the fabric can be accomplished by various methods, such as one or more of the following: (1) spraying, atomizing or otherwise discharging a binder onto the filaments as soon as they have been charged, for example, charged fibrils or other polymer particles having a polarity opposite to that of the filaments; (2) dipping, spraying or otherwise applying binder particles or a dispersion or solution of binder to the fabric as formed or after its formation on the receiver; (3) cospinning binder filaments along with the essential filaments, either from the same or an adjacent spinneret; (4) pressing and/or heating the as-formed fabric (this is a preferred method); (5) needle-punching the as-formed fabric, for example, as taught by Lauterbach and Norton in U.S. Patent 2,908,064.

Preferred binders with which the filaments can be bonded together at their cross-over points include synthetic organic polymeric materials. The following are representative of the more useful polymeric binders: (1) polyester copolymers, such as an 80/20 copolymer of ethylene terephthalate and ethylene isophthalate, especially when used as a filamentary binder for poly(ethylene terephthalate) filaments; (2) polyamide copolymers, such as a 90/10 copolymer of hexamethylene adipamide and caproamide, especially when used as a filamentary binder for polyamide filaments; and (3) elastomeric acrylic copolymers, especially when applied from a dispersion, such as a copolymer of about 94–99% by weight of a methyl, ethyl, propyl or butyl ester of acrylic or methacrylic acid and 1–6% by weight of acrylic, methacrylic or itaconic acid, and preferably a terpolymer formed by copolymerizing about 80–90 parts ethyl acrylate, 4–20 parts methyl acrylate or methyl methacrylate and 1–6 parts acrylic or methacrylic acid, as taught in Example A of U.S. Patent 2,757,106. These copolymers are also useful when reacted with an oxide, hydroxide or basic salt of a polyvalent metal as described in the cited patent.

The best amount of binder to employ usually falls within the range of about 3–50% by weight of bonded fabric, although more binder sometimes gives good results.

In addition to the essential continuous filaments the fabric can contain a minor proportion of any other material known to be useful in fibrous sheet structures, such as fibers of paper-making length and any of the known staple fibers including crimped or uncrimped, organic and inorganic, natural and synthetic fibers.

A more detailed description of the bonded nonwoven fabrics described above which are useful in practicing this invention, as well as methods of making them, is given by Guandique and Katz in Belgian Patent 608,644 and by Kinney in Belgian Patent 608,646. The disclosures of these two patent are incorporated herein by reference.

Methods known in the art of making tufted carpets are employed for stitching the primary backing material with yarn in such a manner as to form on the top (normally exposed) surface of the material a pile composed of numerous closely-spaced erect loops of yarn. The yarn at the base of each loop extends through the primary backing and is visible on the bottom surface of the resulting loop-stitched or "tufted" structure.

The yarn used in forming the pile can be made of any type of fiber known to be useful for tufted carpets, for example, nylon, acrylics, wool, cotton and rayon.

A layer of the thermoplastic adhesive composition is applied in a molten condition to the bottom surface of the tufted structure; thus, the bottom of the primary backing and the base portion of the loops of pile yarn present therein are coated with the molten adhesive.

It is usually best to apply the adhesive in an amount equal to about 10 to 30 ounces per square yard of tufted material. The best amount to apply in a particular application will depend on such factors as desired strength of tuft bond, density of the adhesive composition being used, and the proportion and cost of film-forming components. Another factor is whether or not a secondary backing is to be applied.

Any method known in the art of applying coatings of molten thermoplastic adhesives can be employed for applying the adhesive layer, for example, by extrusion, heated doctor blade, or by passing the bottom surface of the tufted material in contact with the top surface of a rotating roller partially submerged in a tank of the molten adhesive. A doctor blade is commonly used to control the thickness of adhesive on the roller.

The adhesive layer on the tufted material, after it has solidified by cooling, firmly bonds the base of each loop of yarn to the primary backing material. When the carpet is also to comprise a secondary backing, the cooling of the adhesive layer can be delayed until after the secondary backing is applied. Alternately, the cooled adhesive layer can be reactivated by heating at least the exposed surface of it to a molten state, applying the secondary backing and again cooling the adhesive layer. A third technique is to apply a second layer of molten adhesive to the solidified first layer, apply the secondary backing, and cool. After the secondary backing is applied, regardless of technique, in contact with a layer of the molten adhesive which layer is then cooled, the secondary backing becomes a firmly bonded integral part of the carpet structure.

Useful secondary backing materials include the materials listed above as primary backing materials as well as others known in the carpet-making art, for example, those woven from paper-fiber cord.

The tuft-bonding adhesive composition contains about 10 to 90%, preferably about 20–55%, of an ethylene copolymer based on the weight of the film-forming components. The ethylene copolymer contains about 60–85%, preferably about 65–75%, of ethylene units and about 40–15%, preferably about 35–25%, of vinyl acetate units based on the weight of the copolymer. The procedures described in U.S. Patents 2,200,429 and 2,703,794 are useful for preparing the ethylene/vinyl acetate copolymer. The ethylene copolymer can also contain about 0.001 to 3% of a comonomer such as acrylic acid, methacrylic acid, itaconic acid, acrylamide, beta dimethylaminoethyl methacrylate, beta hydroxyethyl acrylate, diallyl maleate, diallyl phthalate, diallyl ether or ethylene glycol dimethacrylate.

An ethylene copolymer having an inherent viscosity of about 0.45 to 1.50 is usually preferred and one having an inherent viscosity, which varies directly with the molecular weight, is measured from a 0.25% solution of the copolymer in toluene at 86° F.

As the second component, the adhesive composition contains about 90 to 10%, preferably about 50 to 10% (based on the weight of the film-forming components) of a wax. A wax is selected having a melting point such that the adhesive composition has a suitable melting point for the intended application. Preferred waxes have a melting point of about 120–220° F. and include Fisher-Tropsch waxes and the hydrocarbon waxes obtained by the distillation of petroleum ("petroleum waxes"), such as paraffin waxes and microcrystalline waxes. Candelilla and carnauba are also useful waxes, especially when they make up a minor proportion of the wax component.

As an optional film-forming component, the adhesive composition can contain up to about 80%, preferably about 20 to 64% (based on the weight of film-forming components), of a thermoplastic resin other than said ethylene copolymer. This resin should have a melting point such that the adhesive composition has a suitable melting point. The useful resins include the polyterpenes-resins obtained by distillation of conifers. The rosin family of resins (rosin and solid rosin derivatives) constitute a particularly useful class of resins, including such derivatives as esters of rosin and glycerol, esters of rosin and pentaerythritol, hydrogenated rosin, and esters of hydrogenated rosin and glycerol or pentaerythritol. Also useful are various coumaroneindene resins, permanently fusible phenolic resins, and petroleum hydrocarbon resins formed from dienes and reactive olefins via the deep cracking of petroleum. A typical useful petroleum hydrocarbon resin (e.g., "Piccopale" 100S from Pennsylvania Industrial Chemical Corporation) has a softening point (B.R.) of about 212° F., a specific gravity at 77° F. of 0.970 to 0.975, a refractive index at 68° F. of 1.5116, an acid number of less than one, an iodine value of 120 (WIJS), a bromine number of 7.3 and a molecular weight of about 1100.

Another optional but sometimes preferred ingredient of the adhesive composition is a filler in the form of a finely divided material that does not melt or decompose at the temperature of the molten adhesive. The best amount of a particular filler to add will depend on such factors as the influence that the filler has on viscosity of the molten adhesive and the required strength of tuft bond. With such preferred fillers as barium sulfate, calcium carbonate, talc, clay and silica, up to about 50% filler can usually be added (based on the total weight of adhesive) without undue reduction of bond strength or increase in viscosity, the preferred amount in most cases being about 25–35%.

A stabilizer can be added to enhance the pot-life of the molten adhesive. Typical useful stabilizers or antioxidants for the adhesive composition are the 2,4,6-trialkylated monohydroxy phenols, e.g., 2,4,6-tri-tertiarybutyl phenol and 2,6-di-tertiary-butyl-4-methyl phenol, which are available from Shell Chemical under the trademark "Ionol"; 4,4'-thio-bis(6-tertiary butyl m-cresol) available from Monsanto as "Santowhite" crystals; butylated hydroxy anisole and butylated hydroxy toluene. Effective proportions of stabilizer ordinarily are in the range of from about 25 parts per million to about 0.5 part per 100 parts by weight of the adhesive composition, preferably about 0.1 to 0.4 part per 100.

Other additives, for example, pigments and plasticizers, can also be added to the adhesive.

To illustrate the preparation of the adhesive composition, a wax, an antioxidant and a polyterpene resin can be melted and mixed at about 250° F., then the ethylene copolymer added slowly with stirring until thoroughly dispersed. Or a sigma blade mixer can be used to blend the ethylene copolymer with about an equal weight of wax and/or polyterpene resin at about 250° F. until a smooth, uniform molten mixture is obtained, then the remaining wax and/or polyterpene resin and any filler to be added is blended in. The molten mixture can be pumped directly to a carpet coating apparatus or cast into slabs for subsequent remelting prior to use in the method of this invention.

The novel method of this invention permits tufted carpets of excellent quality to be manufactured with surprising speed, from 30 to 60 f.p.m. In contrast with prior art methods which employ rubber latex tuft adhesives, this method has the following advantages:

(1) Instead of requiring a lengthy drying and curing period to set the adhesive, it is set simply by chilling it; this takes only a few minutes.

(2) Since the cooling rolls or other chilling means take up much less plant space than the long drying and curing ovens needed in a latex tuft-adhesive system, greater yardage of product can be made in a plant of any given size.

(3) Since the carpet structure is not exposed to an elevated temperature for an extended period of time, as it is in a latex system, the danger of damaging heat-sensitive pile yarns or coloring agents is substantially eliminated. The vapors liberated in the ovens of a latex system are also a source of yarn and colorant damage.

(4) If defects are noticed in the secondary backing after it is bonded to the carpet structure, the defective backing is readily removed and replaced following heating the adhesive layer to its melting point; in a latex system, such a salvage operation is impossible.

(5) Each step in this process can be watched closely and if something goes wrong it can be corrected at once; in a latex system, since a large yardage of material is hidden from view in the drying and curing ovens, trouble is sometimes not detected until after there is a serious financial loss.

(6) It is common for a latex adhesive to give the finished carpet an undesirable odor. The adhesive used in the present method is well adapted for odorless formulation.

(7) When using certain high-strength nonwoven fabric backings, the present method is capable of giving superior adhesive of loops to the nonwoven material and adhesion of nonwoven secondary backing to the carpet compared with latex and other prior art systems. And the method does not require processing temperature-time cycles harmful to nonwoven backings made of polyethylene and the like.

(8) Superior adhesion of the pile loops is also obtainable when using conventional jute backings.

The product of this novel method is useful wherever carpets are used, for example, on automobile floors and on floors and stairways in homes, restaurants, hotels, office buildings, and in passenger sections of ships, trains and airplanes.

The examples which follow are given for the purpose of illustrating the invention. All quantities shown are on a weight basis unless otherwise indicated.

Example 1

A tufted broadloom carpet is manufactured by first stitching a conventional woven jute fabric primary backing material with a "tufted carpet" grade of nylon yarn to form on the top surface of the jute fabric a pile of closely spaced erect loops of the yarn. The jute fabric backing has a weight of 12 ounces per square yard, a width of 15 feet and a length of 100 feet. In the stitching (tufting) operation, the backing material is advanced by means of conventional drive rolls, the tufting is done at a rate of about 600 stitches per minute, 7 stitches per inch, with about 1000 needles across the width of the material.

The resulting tufted nonbonded carpet material is unwound from a storage roll, passed through a heat zone having an ambient temperature of 200° F., and then passed through a roller coating apparatus where the bottom (non-pile) surface is coated with 19 ounces per square yard of a molten adhesive composition having the following formula:

|  | Percent by weight |
| --- | --- |
| Ethylene copolymer | 14.0 |
| Wax, synthetic | 17.0 |
| Rosin, Grade WG | 30.6 |
| Dimerized rosin (Hercules "Poly-pale" Resin) | 8.2 |
| Calcium carbonate filler | 30.0 |
| Stabilizer ("Ionol" G-685: 2,4,6-tritertiary-butyl phenol) | 0.2 |
|  | 100.0 |

The ethylene copolymer is a 67:33 copolymer of ethylene and vinyl acetate having an inherent viscosity of 0.78 (0.25% in toluene at 86° F.), a melt index of 26 (ASTM-D-1238-57T), and a softening point of 243° F. (ring and ball).

The synthetic wax ("Paraflint" RG from Moore and Munger Company) has a melting point of 215° F.; it is a Fisher-Tropsch wax.

As the tufted material moves through the coating apparatus, the bottom side of the material passes across the top surface of an applicator roll, the latter being mounted for rotation on its axis and partially submerged in a tank of the molten adhesive which is kept at 275° F. A doctor blade mounted near the applicator roll controls the thickness of the adhesive layer on the roll so that the desired 20 ounces per square yard is applied to the carpet material.

While the adhesive coating is still in a molten state, the coated material is continuously superposed onto a secondary backing material so that the adhesive coated side is in contact with the secondary backing. The secondary backing material is a woven jute fabric weighing about 10 ounces per square yard. Next, the resulting composite material is passed immediately between a pair of nip rolls where the material is subjected to moderate pressure and then around a series of chilled rolls to solidify the adhesive layer.

The product, a high quality double-backed broadloom carpet, is wound up on a storage roll. The primary and secondary backing materials are firmly bonded to each other, and the base of each loop in the pile is firmly bonded to the primary backing. A pull of 13.8 pounds (on the average) is required to pull one of the pile loops loose from the primary backing.

The product is useful as a carpet for covering the floors and stairs of homes and other buildings where carpets are normally used.

Example 2

A tufted carpet is produced by repeating Example 1 except the secondary backing material is a nonwoven fabric weighing 3.3 ounces per square yard. The fabric is composed of poly(ethylene terephthalate) continuous filaments having a loopy configuration, about 50 crimps per inch, and separate and random disposition within the fabric, the filaments being bonded together at spaced points throughout the fabric with cospun filaments of an 80/20 copolymer of ethylene terephthalate and ethylene isophthalate. The majority of the loops are substantially in the plane of the fabric. The weight ratio of the poly(ethylene terephthalate) filaments to the copolymer binder filaments in the fabric is 91:9.

The nonwoven fabric is prepared as follows. Using an apparatus similar to that described in Example 2 of Belgian Patent 608,646, poly(ethylene terephthalate) having a relative viscosity of 34 is melt-spun into filaments from a 68-hole spinneret (7 mil hole diameter) while the 80/20 ethylene terephthalate/isophthalate copolymer is cospun into filaments from an adjacent 34-hole spinneret. Nine grams of copolymer filaments are spun for each 91 grams of the former. The freshly spun filaments are passed in rubbing contact with chromic oxide guide bars to give them an induced electrical charge. An aspirating air jet operating with 50 p.s.i.g. pressure is employed to attenuate and quench the filaments, advance them to an aluminum plate receiver and lay them down on the receiver in separate and random fashion in the form of a loosely constructed nonwoven fabric or batt. The receiver is moved sufficiently to yield a batt of uniform thickness.

Next, the batt is placed between two sheets of paper in a press and consolidated into a denser and stronger nonwoven fabric under a pressure of 150 p.s.i. while heated to 60° C. The consolidated fabric is removed from between the paper sheets, placed in the press between two pieces of 60 mesh wire screen, and embossed under a pressure of 150 p.s.i. while heated at 210° C. The latter operation completes the crimping and the bonding of the filaments. The fabric can be dyed as desired, for example, with a red dye. Carpet properties and utility are similar to those of the Example 1 product.

Example 3

A tufted carpet having properties and utility similar to the product of Example 1 is produced by repeating Example 2 except the nonwoven fabric secondary backing material is made of polypropylene filaments. The nonwoven fabric is made by the procedure described in Example 3 of Belgian Patent 608,646. The molten adhesive coating is at a temperature of about 264° F. when the adhesive-coated tufted material is superposed onto the secondary backing material (just below the softening point of the nonwoven).

A similarly useful carpet can be made by replacing the polypropylene filaments in Example 3 with polyethylene filaments.

Example 4

A tufted carpet is produced by repeating Example 3 except the polypropylene nonwoven fabric described in that example is used as the primary backing material as well as the secondary backing material. When the product of this example is installed as a wall-to-wall carpet in a home living-room, it is resistant to rippling and buckling on wide fluctuations in relative humidity.

Example 5

A tufted carpet is produced by repeating Example 1 except the molten adhesive composition has the following formula:

|  | Percent by weight |
| --- | --- |
| Ethylene copolymer—same as in Example 1 | 14.0 |
| Microcrystalline petroleum wax, M.P. 170–175° F. | 17.4 |
| Rosin | 38.3 |
| Barium sulfate filler | 30.0 |
| Stabilizer—same as in Example 1 | 0.3 |
|  | 100.0 |

The molten adhesive has a viscosity of about 3000 centipoises at 335° F. At 77° F., a sample of the solid, rubbery adhesive composition having a cross-sectional area of ⅛ square inch has a 600–800% elongation at break and a tensile modulus of about 320 p.s.i.

Example 6

A tufted carpet is produced by repeating Example 3 except for the following differences: The tufted primary backing is coated with 16 ounces per square yard of a molten adhesive composition having the following formula:

| | Percent by weight |
|---|---|
| Ethylene copolymer | 31.0 |
| Microcrystalline petroleum wax, M.P. 190–195° F. | 30.0 |
| Rosin | 38.6 |
| Stabilizer—same as in Example 1 | 0.4 |
| | 100.0 |

The ethylene copolymer is a 72:28 copolymer of ethylene and vinyl acetate having an inherent viscosity of 0.85, a melt index of 15 and a softening point of 252° F. (all measured as indicated in Example 1). The non-woven fabric secondary backing material is coated with 6 ounces per square yard of the molten adhesive at a temperature of 250° F. just before the adhesive-coated tufted material is superposed thereon, giving the composite adhesive layer a total weight of 22 ounces per square yard.

In the product of this example, a pull of 24 pounds is required (on the average) to pull one of the pile loops loose from the primary backing.

Example 7

A tufted carpet is produced by repeating Example 1 except that the tufting fiber is polypropylene, and 16 ounces of the following molten adhesive is applied to the back side of the carpet at a temperature of 310° F.

| | Percent by weight |
|---|---|
| Ethylene copolymer | 17.5 |
| Wax, synthetic | 11.5 |
| Rosin | 40.8 |
| Calcium carbonate filler | 30.0 |
| Stabilizer (butyl hydroxylated toluene) | 0.2 |

The ethylene copolymer contains about 27–29% by weight vinyl acetate, has a melt index of 12–18; and a softening point of 280° F. (properties measured as in Example 1). The rosin component is "Piccovar" L–70, Pennsylvania Industrial Chemical Corp.'s alkyl aromatic resin having a softening point of 70° C. The carpet was moved past the coating station at a rate of 30 feet per minute.

The resulting carpet exhibited excellent physical and aesthetic properties.

Since many different embodiments of this invention may be made without departing from the spirit and scope thereof, it is to be understood that the invention is not limited by the specific illustrations except to the extent defined in the following claims.

I claim:
1. A process for backsizing a tufted carpet having a primary textile backing and non-woven tufts of synthetic fibers protruding therefrom which comprises heating a non-aqueous solvent free polymeric backsizing composition to a temperature of about 160° F. to 300° F., said temperature being below the melting points of said textile backing and said synthetic fibers and substantially above the melting point of said composition, applying a uniform coating in an amount from about 10 to 30 ounces per square yard of said carpet of said composition in a molten state to the back side of said carpet at a coating station while moving said carpet past said station at a speed of from about 30 to 60 feet per minute, and thereafter solidifying said coating by cooling it below its melting point, said backsizing composition consisting essentially of from about 10% to 90% by weight of a copolymer of ethylene and vinyl acetate containing from about 60% to 85% by weight of ethylene and from about 40% to 15% by weight of vinyl acetate, from about 90% to 10% by weight of wax, and 0 to about 80% by weight of a thermoplastic resin selected from the group consisting of rosin and solid rosin derivatives, coumarone-indene resins, permanently fusible phenolic resins and petroleum hydrocarbon resins.

2. The process of claim 1 wherein said polymeric composition has a melting point of about 180° F. to 220° F., said composition consisting essentially of about 20% to 55% of the eythylene copolymer, about 50% to 10% of wax, and about 20% to 64% by weight of said thermoplastic resin and from 25% to 35% by weight of an inert filler.

3. The process of claim 1 wherein a secondary carpet backing is applied to the back side of said carpet prior to the cooling step.

References Cited

UNITED STATES PATENTS

| 2,675,337 | 4/1954 | Walker et al. | 161—67 |
| 3,025,167 | 3/1962 | Butler. | |
| 3,048,553 | 8/1962 | Moss | 161—251 |
| 3,036,942 | 5/1962 | Squier. | |

ROBERT F. BURNETT, *Primary Examiner.*

ALEXANDER WYMAN, *Examiner.*

R. A. FLORES, L. M. CARLIN, *Assistant Examiners.*